(12) United States Patent
Makovoz (10) Patent No.: US 12,401,677 B2
(45) Date of Patent: Aug. 26, 2025

(54) RISK-BASED CYBER DETECTION SYSTEM

(71) Applicant: CyberActive Technologies LLC, Wilmington, DE (US)

(72) Inventor: David Makovoz, Silver Spring, MD (US)

( * ) Notice: Subject to any disclaimer, the term of this patent is extended or adjusted under 35 U.S.C. 154(b) by 161 days.

(21) Appl. No.: 18/494,871

(22) Filed: Oct. 26, 2023

(65) Prior Publication Data

US 2025/0141909 A1    May 1, 2025

(51) Int. Cl.
*H04L 9/40*    (2022.01)
*H04L 41/22*   (2022.01)

(52) U.S. Cl.
CPC .......... *H04L 63/1433* (2013.01); *H04L 41/22* (2013.01); *H04L 63/1416* (2013.01)

(58) Field of Classification Search
CPC .. H04L 63/1433; H04L 41/22; H04L 63/1416
USPC ............................................. 726/22; 709/224
See application file for complete search history.

(56) References Cited

U.S. PATENT DOCUMENTS

| | | | |
|---|---|---|---|
| 12,155,691 B2* | 11/2024 | Koral | H04L 63/1458 |
| 2016/0249085 A1* | 8/2016 | Ben-Atiya | H04N 21/85406 |
| 2018/0144138 A1* | 5/2018 | Zhang | G06F 21/577 |
| 2019/0098028 A1* | 3/2019 | Ektare | H04L 43/10 |
| 2020/0100115 A1* | 3/2020 | Skaaksrud | A62C 37/44 |
| 2021/0303699 A1* | 9/2021 | Cheng | G06F 21/577 |
| 2023/0325683 A1* | 10/2023 | Johnson | G06N 5/022 706/46 |

* cited by examiner

Primary Examiner — Liangche A Wang (57) ABSTRACT

A system that comprises a computer including a processor and a memory is disclosed. The memory includes instructions such that the processor is programmed to: determine a risk level corresponding to an alert, the alert corresponding to at least one node of a plurality of nodes of a communication network; calculate a risk level propagation based on the risk level; and generate a response corresponding to a node type of the at least one node when the risk level exceeds a response threshold.

17 Claims, 6 Drawing Sheets

RISK-BASED CYBER DETECTION SYSTEM

BACKGROUND

Computer networks may include multiple computing assets that enable users to access shared resources including a variety of digital content accessible by a communication network. A computer network can be a set of computers connected to form one or more nodes within a personal area network, a local/virtual area network, a wide area network, or any other type of network architecture associated with a collection of computing devices. Access to the Internet external to a particular network presents a variety of cyber security challenges. As such, computing assets within an example computer network may be susceptible to data breaches or attacks from malicious users seeking unauthorized access to one or more assets within the network.

SUMMARY

A system that comprises a computer including a processor and a memory is disclosed. The memory includes instructions such that the processor is programmed to: determine a risk level corresponding to an alert, the alert corresponding to at least one node of a plurality of nodes of a communication network; calculate a risk level propagation based on the risk level; and generate a response corresponding to a node type of the at least one node when the risk level exceeds a response threshold.

In other features, the processor is further programmed to modify the risk level based on the risk level propagation calculation.

In other features, the processor is further programmed to receive the alert from an endpoint monitoring agent corresponding to the at least one node.

In other features, the processor is further programmed to generate a graph representing the plurality of nodes of the communication network.

In other features, the processor is further programmed to generate a risk graph, the risk graph including one or more nodes of the plurality of nodes, wherein the one or more nodes comprise a risk value exceeding a predefined risk threshold.

In other features, the response comprises deprovisioning of the at least one node.

In other features, the response comprises isolating the at least one node.

In other features, the processor is further programmed to access a data structure to determine the risk level, wherein the data structure includes a mapping of the alert to the risk level.

In other features, the processor is further programmed to determine the risk level according to $R_i(t+1)=\Sigma_{j\in \mathcal{N}_i} \mathcal{F}(R_j(t), R_i(t)decay_i, W_{ij})$, where $R_i(t+1)$ is the risk level corresponding to the at least one node at time t+1, $\mathcal{F}$ is the risk level function, $R_j(t)$ is a risk level at time t for a node adjacent to the at least one node, $R_i(t)$ is a risk level at time t for the at least one node, $decay_i$ is a decay constant corresponding to the at least one node, $W_{ij}$ is a likelihood of communication between the at least one node and the adjacent node, and $\mathcal{N}_i$ is the set of all nodes connected to node $V_i$.

A method is disclosed. The method includes determining a risk level corresponding to an alert, the alert corresponding to at least one node of a plurality of nodes of a communication network and calculating a risk level propagation based on the risk level. The method further includes generating a response corresponding to a node type of the at least one node when the risk level exceeds a response threshold.

In other features, the method includes modifying the risk level based on the risk level propagation calculation.

In other features, the method includes receiving the alert from an endpoint monitoring agent corresponding to the at least one node.

In other features, the method includes generating a graph representing the plurality of nodes of the communication network.

In other features, the method includes generating a risk graph, the risk graph including one or more nodes of the plurality of nodes, wherein the one or more nodes comprise a risk value exceeding a predefined risk threshold.

In other features, the response comprises deprovisioning of the at least one node.

In other features, the response comprises isolating the at least one node.

In other features, the method includes accessing a data structure to determine the risk level, wherein the data structure includes a mapping of the alert to the risk level.

A system that includes a computer is disclosed. The computer includes a processor and a memory. The memory includes instructions such that the processor is programmed to: generate a graph including a plurality of nodes representing a plurality of computing devices within a communication environment and a plurality of edges representing connections between the plurality of computing devices; calculate a risk value for each node of the plurality of nodes; determine a likelihood of risk propagation between a first node and a second node of the plurality of nodes; modify the risk value for each node based on the likelihood of risk propagation; determine that the risk value for the first node exceeds a response threshold; and generate a response corresponding to a node type of the first node.

In other features, the processor is further programmed to determine the likelihood of risk propagation based on a communication type between the first node and the second node.

In other features, the processor is further programmed to calculate the risk value for each node based on an alert type corresponding to each node.

DETAILED DESCRIPTION

Figure 1:
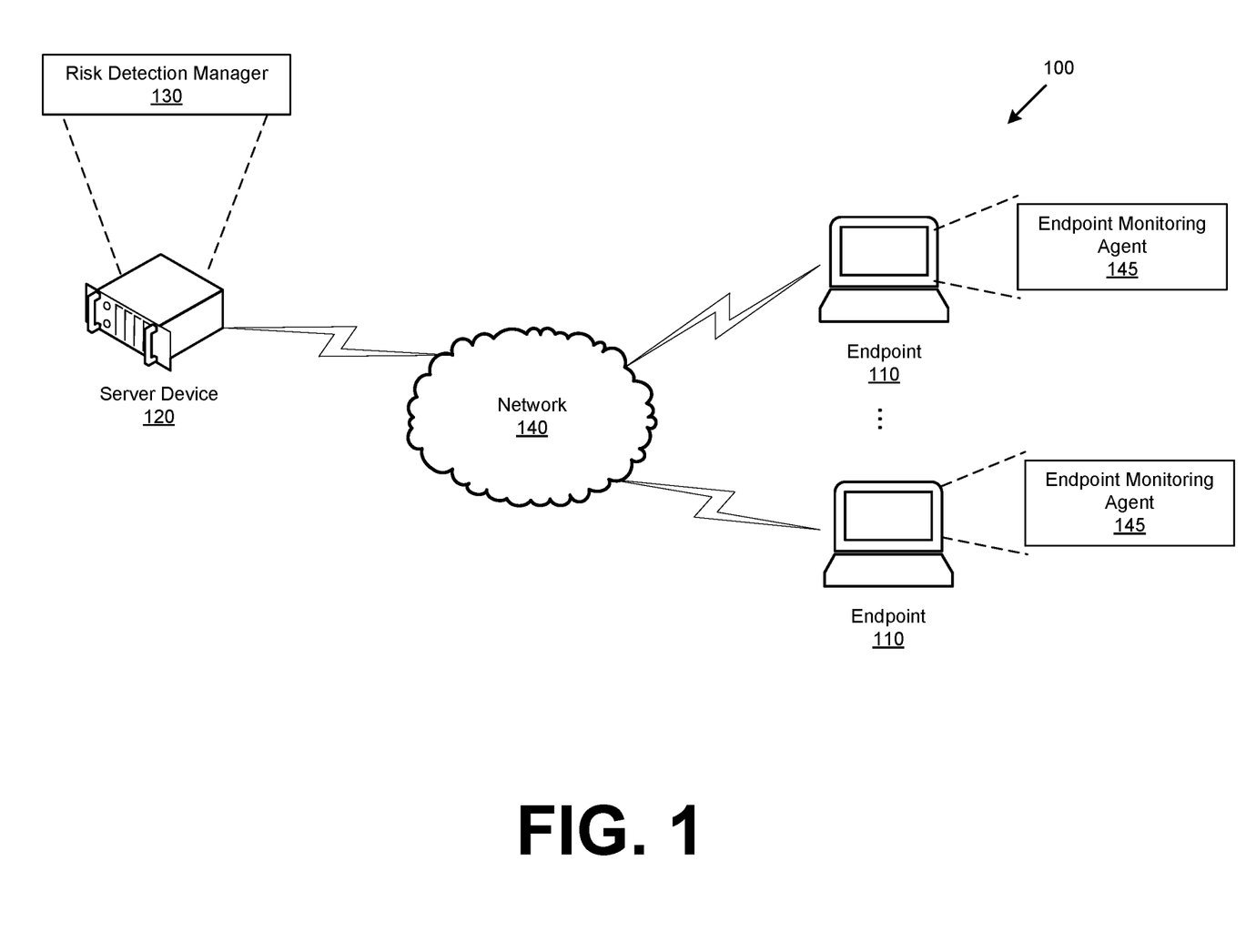
FIG. 1 is a diagram of an example risk-based cyber detection system within a computing environment.

FIG. 1 illustrates an example environment 100 that includes a set of user devices 110 (referred to collectively as "endpoints 110" and individually as "endpoint 110"), a set of server devices 120 (referred to collectively as "server devices 120" and individually as "server device 120"), a risk detection manager 130, and a network 140. Devices of environment 100 may interconnect via wired connections, wireless connections, or a combination of wired and wireless connections.

The endpoint 110 includes one or more devices capable of receiving, generating, storing, processing, and/or providing information associated with an account and/or a transaction for which the account is to be used. For example, the endpoint 110 may include a desktop computer, a mobile phone, a laptop computer, a tablet computer, a handheld computer, a gaming device, a wearable communication device, e.g., a smart wristwatch, a pair of smart eyeglasses, etc., or a similar type of device.

The server device 120 includes one or more devices capable of receiving, providing, storing, processing, and/or generating information associated with an account and/or a transaction for which the account is to be used. For example, the server device 120 may include a server (e.g., in a data center or a cloud computing environment), a data center (e.g., a multi-server micro data center), a workstation computer, a virtual machine (VM) provided in a cloud computing environment, or a similar type of device. In some implementations, the server device 120 may include a communication interface that allows the server device 120 to receive information from and/or transmit information to other devices in environment 100.

The risk detection manager 130 includes a computing system of one or more devices capable of processing information from and/or transmitting information to the endpoints 110, as described in greater detail below. In an example implementation, as shown in FIG. 1, the server device 120 includes the risk detection manager 130. In some examples, the server device 120 may comprise a cloud server or a group of cloud servers. In some implementations, the risk detection manager 130 may be designed to be modular, such that certain software components can be swapped in or out depending on a particular need. As shown, the risk detection manager 130 includes a risk detection manager 130 that determines whether one or more alerts are associated with a malicious cyber-attack, which is described in greater detail herein.

In various implementations, the risk detection manager 130 communicates with an endpoint monitoring agent 145 residing on the endpoints 110. The endpoint monitoring agent 145 comprises executable software that generates and/or monitors log data and/or files. The generated log data can include certain parameters or attributes associated with security and non-security related events and activities that occur within one or more communication networks, such as the network 140. As discussed in greater detail below, the log data and/or log files can be parsed into alerts that are used to generate graph elements. The log data and/or log files can comprise, but is not limited to, failed authentication attempts, attempts to access privileged accounts, spoofing attempts, port scans, land attacks, Domain Name System (DNS) traffic, cloud access security broker (CASB) data, Next Generation Firewalls (NGFW) data, intrusion detection system (IDSs) data, endpoint detection and response (EDR) system data, or the like.

The network 140 includes one or more wired and/or wireless networks. For example, the network 140 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2:
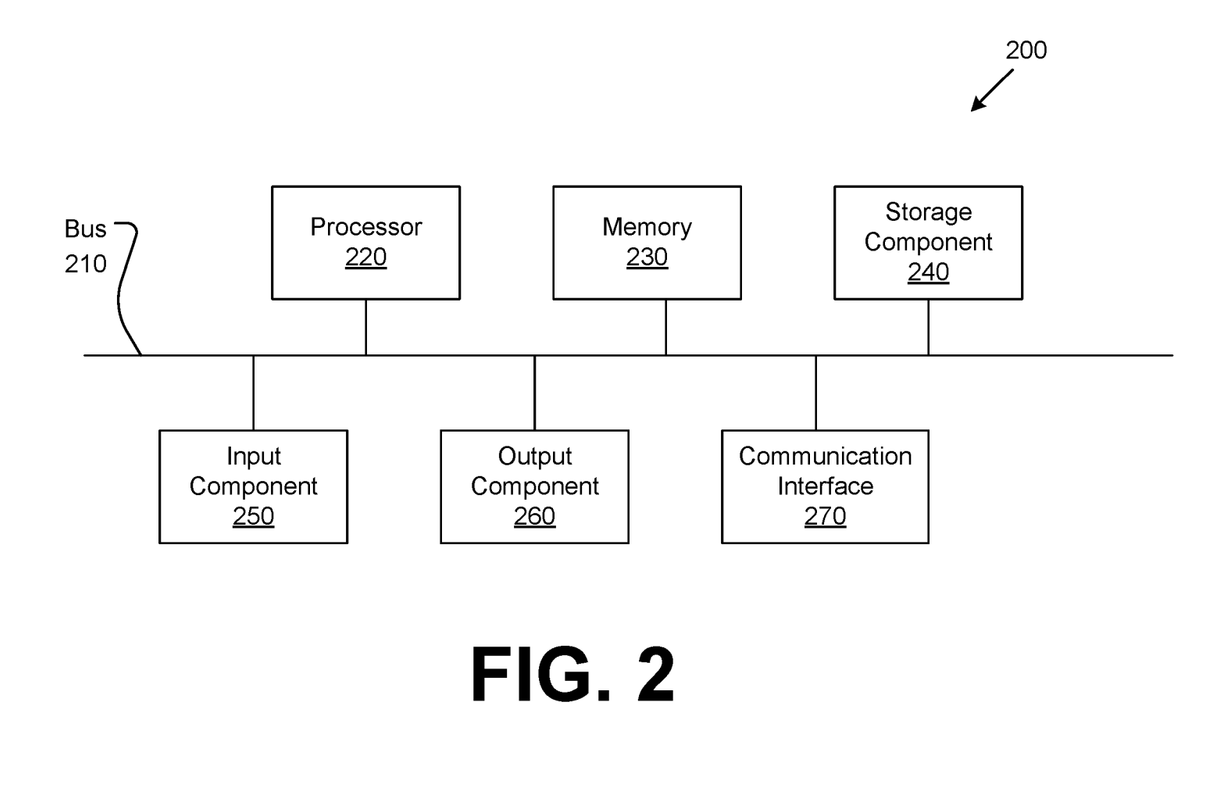
FIG. 2 is a diagram of an example computing device.

FIG. 2 is a diagram of example components of a device 200. The device 200 may correspond to the endpoint 110, the server device 120. In some implementations, the endpoint 110 and/or the server device 120, may include one or more devices 200 and/or one or more components of the device 200. As shown in FIG. 2, the device 200 may include a bus 210, a processor 220, a memory 230, a storage component 240, an input component 250, an output component 260, and a communication interface 270.

The bus 210 includes a component that permits communication among the components of device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random-access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

The risk detection manager 130 receives alerts generated by the endpoint monitoring agent(s) 145. Using the alerts, the risk detection manager 130 determines whether the alerts are associated with a malicious cyber-attack. The risk detection manager 130 can determine that one or more alerts are associated with a malicious cyber-attack based on that (1) the alerts affect a group of endpoints 110 connected to one another; (2) the alerts persist in time; and (3) endpoints 110 connected to an affected endpoint 110 can have a heightened risk level due to the possibility of lateral movement. In the event that a value associated with the determined risk level exceeds a predefined risk level threshold, the risk detection manager 130 initiates a response directed to the affected endpoint(s) 110.

Figure 3A:
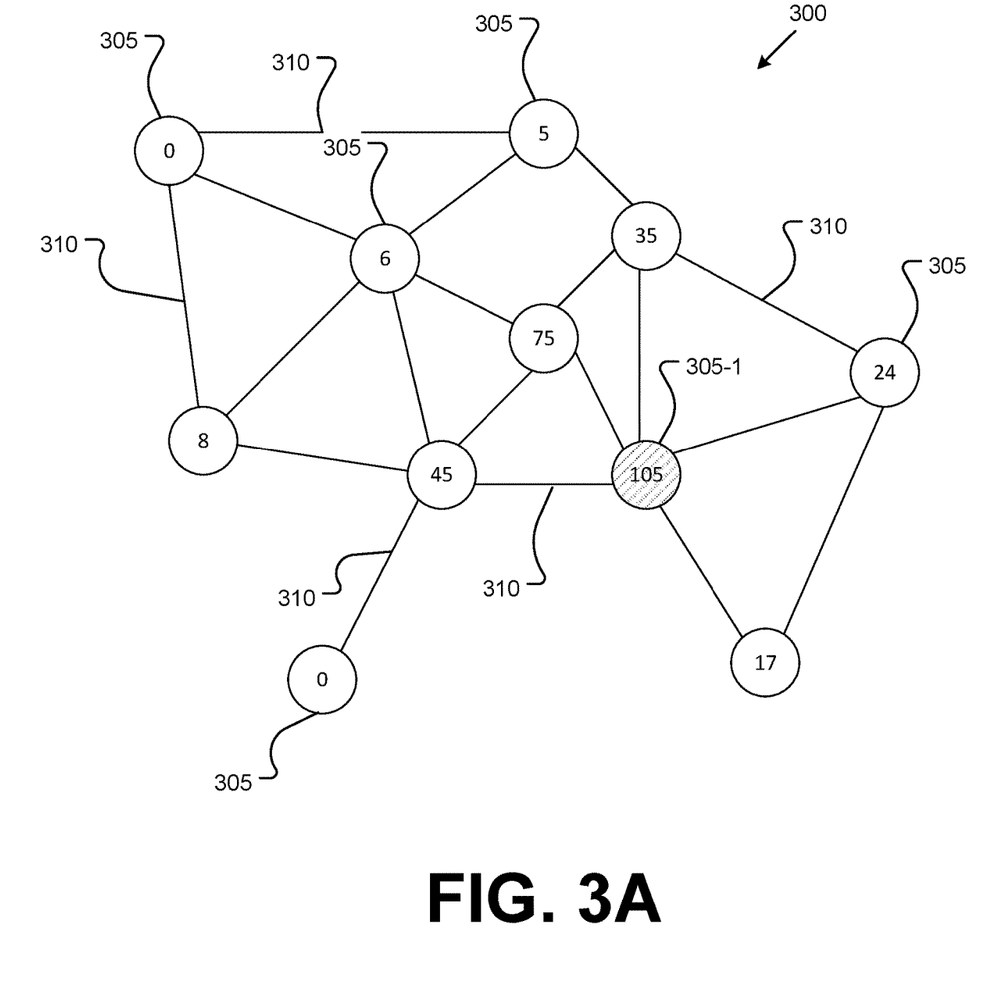
FIG. 3A is a diagram illustrating an example graph including multiple nodes, where each node has a corresponding risk value.
Figure 3B:
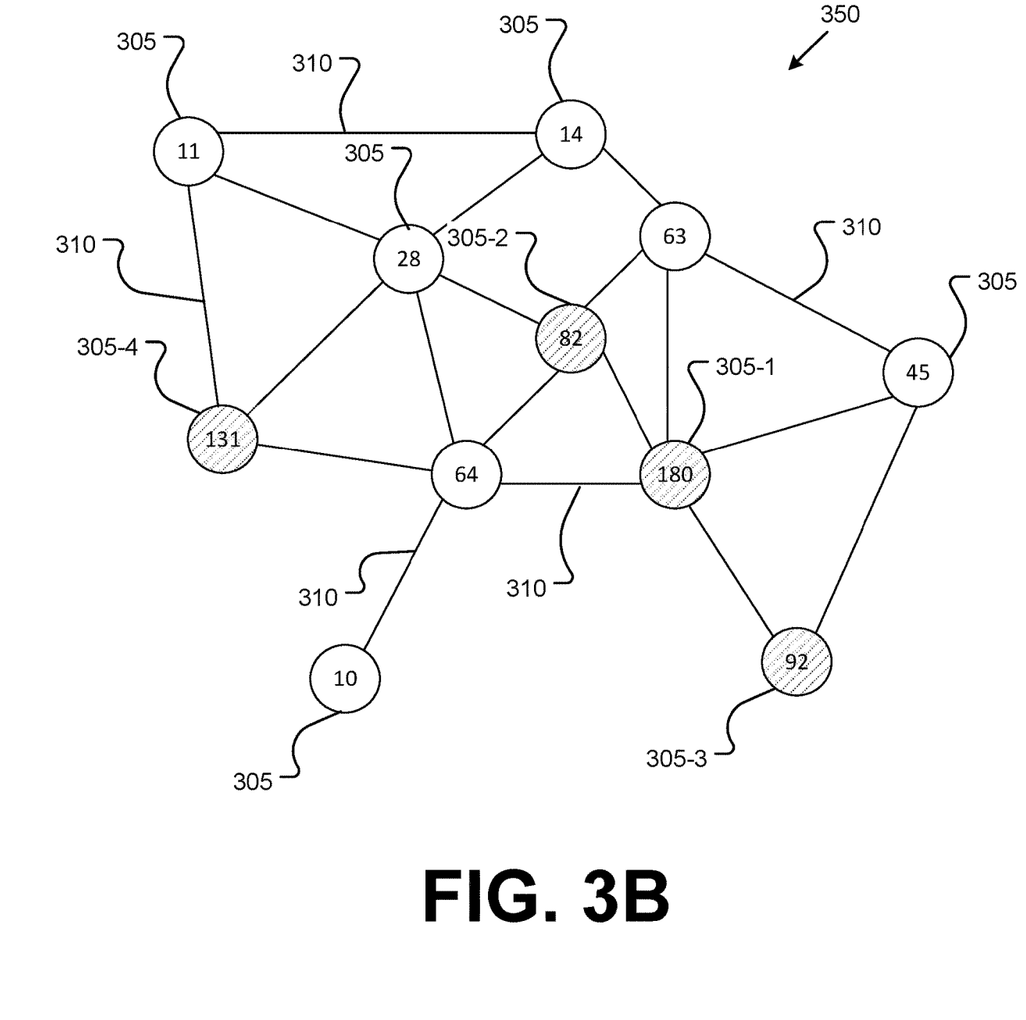
FIG. 3B is another diagram illustrating an example graph including multiple nodes, where each node has a corresponding risk value.

FIGS. 3A and 3B illustrate example graphs 300, 350 generated by the risk detection manager 130. As shown, the graph 300 includes multiple nodes 305 and multiple edges 310. Within the present disclosure, entities, such as endpoints 110, monitored within a communication network, such as network 140, are represented as nodes 305 and events, e.g., actions, between entities can comprise edges 310. For instance, an event between entities can comprise an action that causes the endpoint monitoring agent(s) 145 to generate an alert.

The risk detection manager 130 can include a data structure that maps each alert, i.e., alert type, with a predefined risk level R, i.e., a risk value. In an example implementation, the data structure can comprise a lookup table mapping an alert type to a risk level R. For example, a failed authentication alert may comprise a risk level R of four (4), and an attempt to access a privileged account may comprise a risk level R of eight (8). It is understood that a risk level of a node 305 can be defined by external factors and internal factors. External factors can include, but not necessarily limited to, alerts generated by the endpoint monitoring agent 145 and/or communications between nodes 305. Internal factors can include, but are not limited to, properties of the underlying physical entity associated with the node 305.

During operation, the risk detection manager 130 can change a risk level as a result of risk propagating through the communication network 140 from a node 305 having an elevated risk value to nodes 305 directly connected to the node 305 having the elevated risk value. The risk level can also change due to the risk level R of each node 305 decaying with time. In an example implementation, the decay rate is determined by a predetermined constant decay value.

The risk levels can propagate to connected nodes 305 based on an averaged over time connectivity value between the nodes 305 and/or based on communication between nodes 305, i.e., dynamic propagation.

As discussed herein, the risk detection manager 130 can determine risk levels associated with each node 305 and risk propagation within the network 140. Within a communication network, there can be different types of communication between nodes. The likelihood of risk propagation $\mathcal{L}_\mathcal{C}$ depends on a communication type $\mathcal{C}$. The values $\mathcal{L}_\mathcal{C}$ for communication types $\mathcal{C}$ can be used in risk level propagation calculations, i.e., devices use domain name server (DNS) servers to resolve hostnames to internet protocol (IP) addresses $\mathcal{L}_\mathcal{C}=0.3$; administrator configures endpoint detection and response (EDR) rules $\mathcal{L}_\mathcal{C}=0.5$; a device queries a database for information $\mathcal{L}_\mathcal{C}=0.1$. It is understood that the aforementioned values are not probabilities and that the relative values are used for determining risk level propagation calculations.

In various implementations, the communication between two nodes $V_i$ and $V_j$ is quantified by connectivity $W_{ij}$. The connectivity values are determined by the number and types of communications between the nodes $V_i$ and $V_j$ during a predefined time period. The communication can be considered directed and undirected.

For undirected communication, the connectivity is symmetrical $W_{ij}=W_{ji}$ and is proportional to the number of communications between the two nodes in both directions and the likelihood of the communications can be defined by Equation 1:

$$W_{ij} = \sum_{\mathfrak{E}} \mathcal{L}_C, \qquad \text{Equation 1}$$

where $\mathfrak{E}\{i\leftrightarrow j\}$ is the set of all communications between nodes $V_i$ and $V_j$ during the predefined time period.

For directed communication, connectivity $W_{ij}$ is proportional to the number of communications from $V_j$ to $V_i$, $W_{ji}$ proportional to the number of communications from $V_i$ to $V_j$, and in general $W_{ij} \neq W_{ji}$. The number of communications is counted for a time period. The time period can be adjustable in one or more implementations. The likelihood of the communications can be defined by Equation 2:

$$W_{ij} = \sum_{\mathfrak{E}} \mathcal{L}_C, \qquad \text{Equation 2}$$

where $\mathfrak{E}\{j\rightarrow i\}$ is the set of all communications from nodes $V_j$ to $V_i$ during the predefined time period.

In an example implementation, if there are only two nodes $V_1$ and $V_2$ having respective decay constants $decay_1$ and $decay_2$—as well as connectivity values $W_{1,2}$ and $W_{21}$, the risk levels at the time step t for node $V_1$ is $R_1(t)$ and for node $V_2$ is $R_2(t)$, then the risk detection manager 130 can determine risk levels at time step t+1 can be defined by Equations 3 and 4:

$$R_1(t+1) = \text{decay}_1 \cdot R_1(t) + W_{1,2} \cdot R_2(t), \quad \text{Equation 3}$$

$$R_2(t+1) = \text{decay}_2 \cdot R_2(t) + W_{2,1} \cdot R_1(t), \quad \text{Equation 4}$$

It is understood that the above equations are examples of updating the risk levels. In another example implementation, the risk levels can be determined using an appropriate risk level function $\mathcal{F}$, i.e., determined by the optimization process as defined by Equation 5:

$$R_i(t+1) = \sum_{j \in \mathcal{N}_i} \mathcal{F}(R_j(t), R_i(t)\text{decay}_i, W_{ij}), \quad \text{Equation 5}$$

where $\mathcal{N}_i$ is the set of all nodes connected to node $V_i$.

The optimization process represents a mathematical approach for determining the function $\mathcal{F}$ by minimizing a loss function. Within the present disclosure, the loss function is related to the effectiveness of the cyber-attack detection, i.e., an amount of time elapsed to detect an attack. In this example, the optimization process includes creating a predetermined number of cyber-attack simulations. The attack simulations can be used as a training dataset that correlates communications with cyber-attacks. Within this context, the moment of attack is known and can be used as the ground truth for the time the attack starts.

Attack simulations can be repeated many times, i.e., thousands of times, millions of times, etc. For each attack simulation, the process described herein is applied and for each run the detection time is recorded. The detection time can be defined as the time elapsed from the beginning of a cyber-attack to the time when an effective response is generated. The response time can be averaged over all simulations. In order to identify an optimal function, different functional forms can be used, and for each functional form the average response time is calculated. The functional form having the minimal response time is considered optimal.

In an example implementation of efficiently determining an optimal function form is genetic programming. Within this context, genetic programming (GP) can comprise a technique of evolving a population of potential solutions/functions over several generations to find the best function. The process starting from a population of unfit, i.e., random, functions for a particular task applies operations analogous to natural genetic processes to the population of functions. The optimal function can be selected from a population of functions defined in Equation 6:

$$\mathcal{F}(R_j(t), R_i(t), \text{decay}_i, W_{i,j}) = \quad \text{Equation 6}$$

$$\text{decay}_i \cdot \sum_{k=1}^{n} a_k \cdot (R_i(t))^k + W_{i,j} \cdot \sum_{l=1}^{n} b_l \cdot (R_j(t))^l,$$

where polynomial coefficients $a_k$ and $b_l$ represent a candidate solution, $R_j(t)$ represents a risk level at time t corresponding to node $V_j$, $R_i(t)$ represents a risk level at time t corresponding to node $V_i$, $\text{decay}_i$ represents a decay constant associated with node $V_i$, $\mathcal{N}_i$ is the set of all nodes connected to node $V_i$, and $W_{i,j}$ represents the likelihood of the communications between nodes $V_i$ and $V_j$. Parameter mutation can be implemented by adding or subtracting a small random value from the polynomial coefficients. The detection time can represent the fitness measure and can be used for the selection process. For example, a probability of selecting a candidate solution is proportional to the inverse detection time. The termination criteria can be the minimal change of the fitness measure and/or the maximum number of iterations. Once the termination criteria is satisfied, the final set of the polynomial coefficients define the optimal form of the function $\mathcal{F}$.

In an example implementation, the connectivity values $W_{ij}$ can be updated periodically, e.g., once an hour, once a day, etc. In yet another example implementation, the update schedule can be more complex and depend on the total risk level in the network or other factors.

Within the context of dynamic propagation, the risk detection manager 130 can update the risk levels for each instance of communication between two nodes $V_1$ and $V_2$ within the directed mode. If communication of type $\mathcal{C}$ is from $V_1$ to $V_2$, then $R_2$ is updated as shown in Equation 7:

$$R_2 = R_2 + \mathcal{L}_C \cdot R_1, \quad \text{Equation 7}$$

If communication of type $\mathcal{C}$ is from $V_2$ to $V_1$, then $R_1$ is updated as shown in Equation 8:

$$R_1 = R_1 + \mathcal{L}_C \cdot R_2, \quad \text{Equation 8}$$

Additionally, for every predefined time period/threshold the risk levels decay can be modeled according to Equations 9 and 10:

$$R_1(t+1) = \text{decay}_1 \cdot R_1(t), \quad \text{Equation 9}$$

$$R_2(t+1) = \text{decay}_2 \cdot R_2(t), \quad \text{Equation 10}$$

Similar to connectivity-based propagation (Equations 1 through 4), the above equations are examples. It is understood that an appropriate function determined by suitable optimization can be used.

If no new alerts are detected in the network 140, the risk level of the nodes 305 eventually drops below a minimum risk level threshold, i.e., threshold to avoid performing unnecessary calculations with negligible levels of risk.

In one example implementation, the risk levels are defined by external factors. In another example implementation, the risk levels of the nodes can also depend on the internal properties of the underlying physical entities associated with the nodes. For example, the risk level can be modified based on the existing vulnerabilities and their scores as defined by the Common Vulnerability Scoring System (CVSS). If a node $V_i$ with an existing vulnerability has the CVSS score $S_{CVSS}$, the modified risk score is defined according to Equation 11:

$$\tilde{R}_i = (1 + S_{CVSS})^\alpha \cdot R_i, \quad \text{Equation 11}$$

where $\alpha$ is an empirically determined constant.

Referring to FIGS. 3A and 3B, graphs 300, 350 represent a communication network 140 including endpoints 110 represented as nodes 305 and the edges 310 represent actions between nodes 305. Within this context, the risk detection manager 130 determines a risk level R associated with each node 305. More specifically, graph 300 illustrates the risk level R of each node 305 at time t and graph 400 illustrates the risk level R of each node 305 at time t+1.

The risk detection manager 130 can generate a response based on the determined risk value of one or more nodes 135. For example, the risk detection manager 130 may determine that a response is required based on the risk values R of the nodes 305 directly. In an example implementation, the criteria for generating a response by the risk detection manager 130 comprises a function of when the risk values of one or more nodes 305 exceeds a predefined response threshold. In various implementations, the predefined response threshold can be based on (1) a number of nodes 305 having a risk value greater than a group response threshold; (2) at least one node 305 with the risk value greater than an individual response threshold; and/or (3) a weighted combination of the risk values of nodes with the risk value greater than a weighted combination response threshold.

As shown in FIG. 3A, node 305-1 comprises a risk level R of one hundred and five (105), which is relatively higher than the risk level R of the other nodes 305. Referring to FIG. 3B, the risk detection manager 130 can update the risk level R of node 305-1 as well as the other nodes 305 within the communication network 140 based on one or more risk level propagation calculations. In this implementation, the relative risk level R of nodes 305-1, 305-2, 305-3, 305-4 exceed a predefined risk threshold such that the risk detection manager 130 generates and transmits an appropriate response to these nodes.

Figure 4:
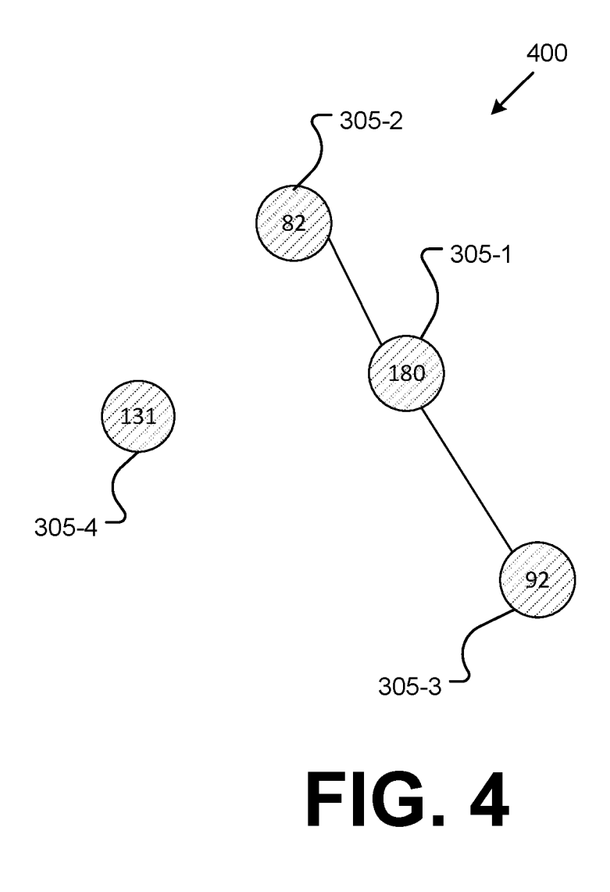
FIG. 4 is a diagram illustrating an example risk graph including multiple nodes, where each node has a corresponding risk value exceeding a predefined risk threshold.

In other implementations, risk detection manager 130 can implement risk graph techniques. For example, as shown in FIG. 4, a risk graph 400 is a graph including only nodes 305 having a risk value exceeding a predefined risk threshold. For simplicity purposes, nodes 305-1, 305-2, 305-3, 305-4 from FIG. 3B comprise the risk graph 400 illustrated in FIG. 4 since these nodes have risk values exceeding the predefined risk threshold. The risk graph could be a single connected graph or a number of unconnected sub-graphs. The risk detection manager 130 can utilize a number of graph analytic metrics to construct risk graph, which may include, but not limited to, metrics as the number of the sub-graphs, the average size of the sub-graphs, betweenness centrality, closeness centrality, eigenvector centrality, edge connectivity, node connectivity, and/or graph distance. The risk detection manager 130 can store and maintain a history of such graph analytic metrics. A suitable anomaly detection algorithm can be applied by the risk detection manager to detect any deviation from normal behavior, and such deviations serve as a trigger to generate a response.

Once the risk detection manager 130 determines a response threshold is exceeded, the risk detection manager 130 generates a response and transmits the response to the one or more nodes 305 having risk values that cause the response threshold to be exceeded. The response can vary according to the node 305 type. For example, for a node 305 type corresponding to a 'user' within the network 140, the response can comprise deprovisioning. In another example, for a node 305 type corresponding to a 'firewall' within the network 140, the response can comprise isolating the node 305 for disconnecting.

Figure 5:
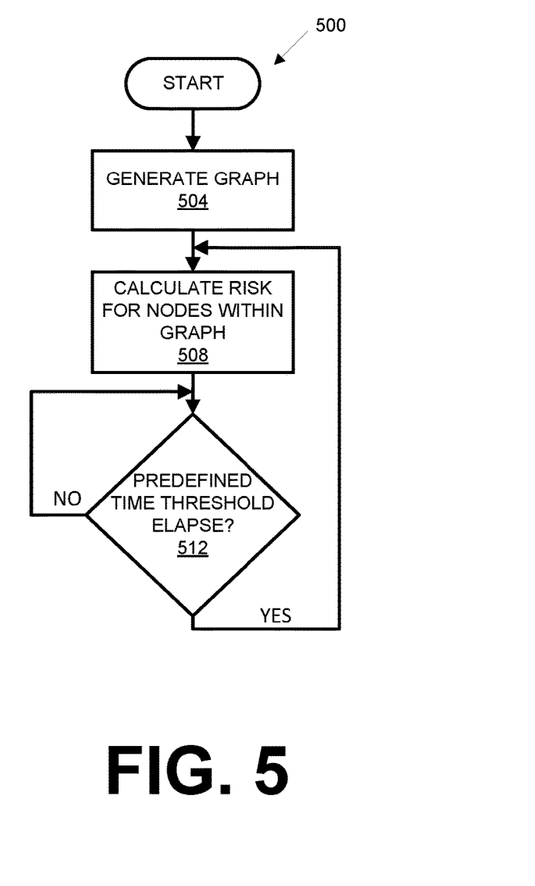
FIG. 5 is a flow diagram illustrating a process for calculating risk values for one or more nodes.

FIG. 5 is a flow chart of an example process 500 for calculating risk values for one or more nodes 305 within a communication network 140. In one or more implementations, one or more process blocks of FIG. 5 may be performed by the risk detection manager 130.

At block 504, a graph representing the nodes 305 within the communication network 140. For example, the risk detection manager 130 can generate a graph representing each endpoint 110 and/or other computing devices, i.e., servers, etc., within the communication network 140 as nodes 305 and each connection, i.e., communications, between the various endpoint 110 and/or other computing devices as edges 310.

At block 508, a risk value for one or more nodes 305 within the communication network 140 is calculated. As discussed above, the risk detection manager 130 can calculate a risk value R for one or more nodes 305 based on alerts received from endpoint monitoring agents 145. The risk detection manager 130 can also modify the risk value R based on risk propagation through the communication network 140.

At block 512, the risk detection manager 130 determines whether a predefined time threshold has elapsed. If the predefined time threshold has not elapsed, the process 500 returns to block 512. Otherwise, the process 500 returns to block 508. As mentioned above, the risk value R can be updated every predefined time period/threshold. In an example implementation, the risk detection manager 130 may modify/update the risk value R for each node 305 after a predefined time period. The risk value R may be updated due to risk level decay and/or due to additional alerts received from an endpoint monitoring agent 145.

Figure 6:
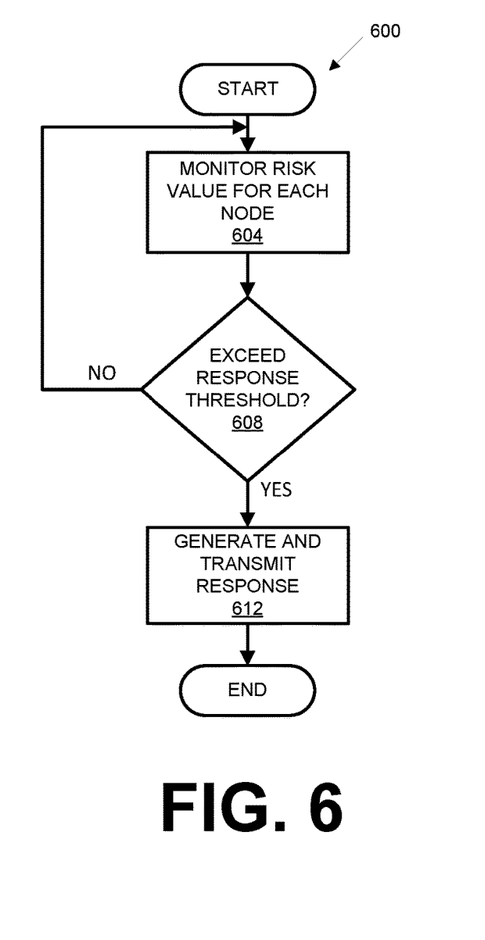
FIG. 6 is a flow diagram illustrating a process for determining whether one more events within a communication network is malicious.

FIG. 6 is a flow chart of an example process 600 for detecting malicious cyber events within a communication network 140. In one or more implementations, one or more process blocks of FIG. 6 may be performed by the risk detection manager 130.

At block 604, the risk detection manager 130 monitors the risk value R for each node 305. At block 608, a determination is made whether one or more risk values R of at least one node 305 exceeds the response threshold. If the response threshold is not exceeded, the process 600 returns to block 604. Otherwise, a response is generated according to the node 305 type and transmitted to the node 305 at block 612. The process 600 then ends.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system comprising a computer including a processor and a memory, the memory including instructions such that the processor is programmed to:
   determine a risk level corresponding to an alert, the alert corresponding to at least one node of a plurality of nodes of a communication network, wherein the risk level is determined according to $$R_i(t+1) = \sum\nolimits_{j \in \mathcal{N}_i} \mathcal{F}(R_j(t), R_i(t) \text{decay}_i, W_{ij}),$$

where $\Sigma j \in \mathcal{N}_i$ is a summation over all nodes j in a set Ni, $R_i(t+1)$ is the risk level corresponding to the at least one node at time t+1, $\mathcal{F}$ is the risk level function, $R_j(t)$ is a risk level at time t for a node adjacent to the at least one node, $R_i(t)$ is a risk level at time t for the at least one node, $\text{decay}_i$ is a decay constant corresponding to the at least one node, $W_{ij}$ is a likelihood of communication between the at least one node and the adjacent node, and $\mathcal{N}_i$ is the set of all nodes connected to node $V_i$;
   calculate a risk level propagation based on the risk level;
   generate a response corresponding to a node type of the at least one node when the risk level exceeds a response threshold; and
   update a risk level of another node of the plurality of nodes based on the risk level propagation.

2. The system as recited in claim 1, wherein the processor is further programmed to receive the alert from an endpoint monitoring agent corresponding to the at least one node.

3. The system as recited in claim 1, wherein the processor is further programmed to generate a graph representing the plurality of nodes of the communication network.

4. The system as recited in claim 1, wherein the processor is further programmed to generate a risk graph, the risk graph including one or more nodes of the plurality of nodes, wherein the one or more nodes comprise a risk value exceeding a predefined risk threshold.

5. The system as recited in claim 1, wherein the response comprises deprovisioning of the at least one node.

6. The system as recited in claim 1, wherein the response comprises isolating the at least one node.

7. The system as recited in claim 1, wherein the processor is further programmed to access a data structure to determine the risk level, wherein the data structure includes a mapping of the alert to the risk level.

8. A method comprising:
   determining a risk level corresponding to an alert, the alert corresponding to at least one node of a plurality of nodes of a communication network, wherein the risk level is determined according to $$R_i(t+1) = \sum_{j \in \mathcal{N}_i} \mathcal{F}(R_j(t), R_i(t)\text{decay}_i, W_{ij}),$$

where $\Sigma j \in \mathcal{N}_i$ is a summation over all nodes j in a set Ni, $R_i(t+1)$ is the risk level corresponding to the at least one node at time t+1, $\mathcal{F}$ is the risk level function, $R_j(t)$ is a risk level at time t for a node adjacent to the at least one node, $R_i(t)$ is a risk level at time t for the at least one node, $\text{decay}_i$ is a decay constant corresponding to the at least one node, $W_{ij}$ is a likelihood of communication between the at least one node and the adjacent node, and $\mathcal{N}_i$ is the set of all nodes connected to node $V_i$;
   calculating a risk level propagation based on the risk level;
   generating a response corresponding to a node type of the at least one node when the risk level exceeds a response threshold; and
   updating a risk level of another node of the plurality of nodes based on the risk level propagation.

9. The method as recited in claim 8, further comprising receiving the alert from an endpoint monitoring agent corresponding to the at least one node.

10. The method as recited in claim 8, further comprising generating a graph representing the plurality of nodes of the communication network.

11. The method as recited in claim 8, further comprising generating a risk graph, the risk graph including one or more nodes of the plurality of nodes, wherein the one or more nodes comprise a risk value exceeding a predefined risk threshold.

12. The method as recited in claim 8, wherein the response comprises deprovisioning of the at least one node.

13. The method as recited in claim 8, wherein the response comprises isolating the at least one node.

14. The method as recited in claim 8, further comprising accessing a data structure to determine the risk level, wherein the data structure includes a mapping of the alert to the risk level.

15. A system comprising a computer including a processor and a memory, the memory including instructions such that the processor is programmed to:
   determine a risk level corresponding to an alert, the alert corresponding to at least one node of a plurality of nodes of a communication network, wherein the risk level is determined according to $$R_i(t+1) = \sum_{j \in \mathcal{N}_i} \mathcal{F}(R_j(t), R_i(t)\text{decay}_i, W_{ij}),$$

where $\Sigma j \in \mathcal{N}_i$ is a summation over all nodes j in a set Ni, $R_i(t+1)$ is the risk level corresponding to the at least one node at time t+1, $\mathcal{F}$ is the risk level function, $R_j(t)$ is a risk level at time t for a node adjacent to the at least one node, $R_i(t)$ is a risk level at time t for the at least one node, $\text{decay}_i$ is a decay constant corresponding to the at least one node, $W_{ij}$ is a likelihood of communication between the at least one node and the adjacent node, and $\mathcal{N}_i$ is the set of all nodes connected to node $V_i$;
   calculate a risk level propagation based on the risk level;
   generate a response corresponding to a node type of the at least one node when the risk level exceeds a response threshold, the response comprising at least one of deprovisioning of the at least one node or isolating the at least one node; and
   update a risk level of another node of the plurality of nodes based on the risk level propagation.

16. The system as recited in claim 15, wherein the processor is further programmed to determine the likelihood of risk propagation based on a communication type between the first node and the second node.

17. The system as recited in claim 15, wherein the processor is further programmed to calculate the risk value for each node based on an alert type corresponding to each node.

* * * * *